Patented Nov. 30, 1943

2,335,680

UNITED STATES PATENT OFFICE 2,335,680

ARYLAMINOANTHRAQUINONE COMPOUNDS

David X. Klein, Wilmington, Del., assignor to E. I. du Pont de Nemours & Company, Wilmington, Del., a corporation of Delaware No Drawing. Application September 25, 1941,
Serial No. 412,289

4 Claims. (Cl. 260—377)

This invention relates to the production of new and valuable arylaminoanthraquinone compounds and more particularly to the preparation of 1 - hydroxy - 4 - arylaminoanthraquinones in which the aryl group is of the benzene series and which carry in the aryl ring the radical

—CH$_2$X where X stands for a group of the class consisting of —CN, —NHCOCH$_3$ and —OCH$_3$, which compounds are particularly valuable as dyes for cellulose esters and ethers and for the coloring of plastic masses. On sulfonation these compounds are rendered substantive to, and may be employed as dyes for, animal and related fibers.

Many of the dyes of the cellulose acetate class which have good affinity for that material have been found to be deficient in their fastness to gas fumes, i. e. to the fumes existing in the atmosphere resulting from the burning of coal gas and the like, which causes a material change of the color of the dye on the cellulose acetate. It is known that the 1-hydroxy-4-anilino-anthraquinone and the corresponding 1-hydroxy-4-paratoluidino-anthraquinone have no affinity for cellulose acetate although when incorporated into such material while it is in plastic form before spinning these color compounds show excellent fastness to gas fumes.

It is an object of the present invention to provide dyestuffs for cellulose acetate and related fibers which have excellent gas fume fastness and which will be substantive to the cellulose acetate fibers.

It is a further object of the invention to provide a process for producing these new substituted arylamino anthraquinone compounds in a simple and economical manner.

I have found that when one mole of phenylamines which carry in the phenyl group the radical —CH$_2$X where X stands for a group of the class consisting of —CN, —NHCOCH$_3$ and —OCH$_3$ are reacted with a mixture of quinizarin and leuco quinizarin so that one free hydroxy group remains in the anthraquinone nucleus, compounds are produced which dye cellulose acetate and related fibers in violet shades of excellent fastness to gas fumes.

While it has been known that the condensation of leuco quinizarin with phenylamines in the presence of boric acid using an excess of phenylamine produces di-condensation products, and that a similar condensation carried out in the absence of boric acid but in the presence of a weaker condensing agent (such as acetic or mineral acid) gives mono-condensation products, we have found that the condensation of leuco quinizarin with phenylamines when the latter are used only in slight excess of that theoretically required and the reaction is carried out in the presence of boric acid and a solvent such as an alcohol or water or a mixture of the same the monocondensation product is obtained in relatively high yields and purity. The amount of excess of the phenylamine required depends upon the reactivity of the particular phenylamine. The ratio of solvent employed to amine should preferably be about 4.18 parts of solvent to 1.1 mole of the amine. The use of from 4 to 5 parts of solvent, i. e. alcohol and/or water per part of quinizarin and leuco quinizarin combined has been found to give very satisfactory results where the amount of amine employed does not exceed that which has been found to give complete monoarylamination of the quinizarin. The reaction will usually come to completion within 12 hours after reaching reaction temperature although with very reactive amines a shorter time is required.

Methyl and ethyl alcohols are preferred as diluents in the reaction although water with alcohol or in admixture with the alcohols operates satisfactorily. The solvents should have a low solvent power for the products of the reaction and they should be miscible with water. The ratio of leuco quinizarin to quinizarin should be preferably in the ratio of 1 to 4. When the ratio of solvent to the leuco quinizarin and quinizarin combined exceeds approximately 4.18 to 1 a corresponding increase in the amount of amine employed is generally desirable.

The following examples are given to illustrate the invention. The parts used are by weight.

Example 1

9.6 parts of quinizarin (100%), 2.4 parts of leuco quinizarin (100%), 6 parts of boric acid, 10.3 parts of 3-amino-benzyl acetamide and 50 parts of 95% ethyl alcohol are heated to 78° C. for 12 hours. The reaction product after diluting with alcohol is filtered off, washed with alcohol and finally with water. The crude cake is then boiled up with 400 parts of a 7% sodium hydroxide solution, filtered and washed alkali free with hot water. The 1-hydroxy-4-(3'-(omega - acetylamino-methyl) -anilino) -anthraquinone of the formula:

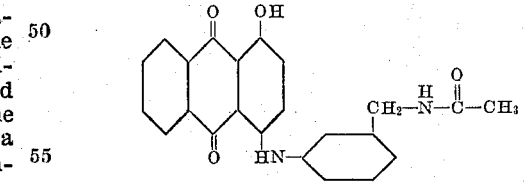

is obtained which dyes cellulose acetate in bluish-violet shades of excellent fastness to gas fumes.

It has a melting point of 222° C. and a nitrogen content of 7.38%.

Example 2

9 parts of quinizarin, 3 parts of leuco quinizarin, 8.8 parts of 2 methyl-5-amino benzyl cyanide, 6 parts of boric acid, and 50 parts of ethyl alcohol (95%) are heated at 78° C. for 12 hours. After cooling the product, 1-hydroxy-4(4'-methyl-3'-cyano-methyl anilino) anthraquinone, is finely ground and extracted at the boil with 400 parts of .7% sodium hydroxide solution. After filtering and washing with 400 parts of .7% sodium hydroxide solution, the precipitate is washed alkali-free and dried. The product has a melting point of 173° C. and a nitrogen content of 7.54%. It dyes cellulose acetate in violet shades of excellent fastness to gas fumes.

Example 3

9 parts of quinizarin, 3 parts of leuco quinizarin, 8 parts of meta amino benzyl cyanide, 6 parts of boric acid, and 50 parts of ethyl alcohol are heated at 78° C. for 12 hours. After working up as in Example 2, the 1-hydroxy-4(m-cyanomethyl aniline) anthraquinone, is obtained which has a melting point of 175° C. and a nitrogen content of 7.34%. It dyes cellulose acetate in violet shades somewhat redder than the product of Example 2.

Example 4

9.4 parts of quinizarin, 2.6 parts of leuco quinizarin, 11.3 parts of 2-methyl-5 (methoxy-methyl) aniline, 6 parts of boric acid, and 50 parts of 50% alcohol are heated at 85–88° C. for 12 hours. After cooling, the product, 1-hydroxy-4(2'-methyl-5'-methoxy-methyl anilino anthraquinone, is filtered and treated (as described in Example 1) with dilute caustic solution, filtered, washed and dried. The product dyes cellulose acetate in reddish-violet shades. It has a melting point of 135.3° C. and a nitrogen content of 3.64%.

Example 5

By substituting 10.1 parts of p-amino benzyl cyanide hydrochloride for the amines in Example 2, and 7.9 parts of sodium metaborate for the boric acid, and carrying out the reaction in the same manner, the 1-hydroxy-4(p-cyano-methyl anilino) anthraquinone is obtained which dyes cellulose acetate in violet shades. It has a melting point of 184° C. and a nitrogen content of 7.64%.

I claim:

1. Compounds of the general formula

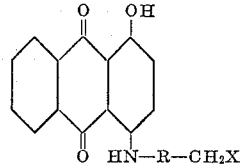

wherein R stands for a radical of the group consisting of phenylene and tolylene radicals in which X stands for a substituent of the group consisting of —CN, —NHCOCH₃, and —OCH₃ which compounds dye cellulose acetate in violet shades fast to gas fumes.

2. 1-hydroxy-4(m-cyanomethyl anilino)-anthraquinone.

3. 1 - hydroxy - 4(4' - methyl - 3'-cyanomethyl anilino) -anthraquinone.

4. 1-hydroxy-4(3' - (omega-acetylamino-methyl) -anilino) -anthraquinone.

DAVID X. KLEIN.